(12) United States Patent
Otani et al.

(10) Patent No.: US 10,723,872 B2
(45) Date of Patent: Jul. 28, 2020

(54) CROSSLINKABLE ELASTOMER COMPOSITION, MOLDED ARTICLE, SEAL MEMBER, PLASMA TREATMENT APPARATUS AND SEMICONDUCTOR MANUFACTURING APPARATUS INCLUDING SAID SEAL MEMBER, AND AGENT FOR DECREASING HARDNESS OF MOLDED ARTICLE, METHOD FOR PRODUCING MOLDED ARTICLE

(71) Applicant: NICHIAS CORPORATION, Tokyo (JP)

(72) Inventors: Kojiro Otani, Shizuoka (JP); Takeshi Kuboyama, Tokyo (JP); Tomoya Shimizu, Shizuoka (JP)

(73) Assignee: NICHIAS CORPORATION, Tokyo (JP)

( * ) Notice: Subject to any disclaimer, the term of this patent is extended or adjusted under 35 U.S.C. 154(b) by 24 days.

(21) Appl. No.: 15/779,834

(22) PCT Filed: Nov. 29, 2016

(86) PCT No.: PCT/JP2016/085377
§ 371 (c)(1),
(2) Date: May 29, 2018

(87) PCT Pub. No.: WO2017/094710
PCT Pub. Date: Jun. 8, 2017

(65) Prior Publication Data
US 2018/0346703 A1    Dec. 6, 2018

(30) Foreign Application Priority Data
Nov. 30, 2015 (JP) .............................. 2015-233655

(51) Int. Cl.
| | | |
|---|---|---|
| *C08L 27/12* | (2006.01) | |
| *C08L 27/20* | (2006.01) | |
| *C08L 83/04* | (2006.01) | |
| *C08L 71/00* | (2006.01) | |
| *C08L 27/16* | (2006.01) | |
| *C08L 27/18* | (2006.01) | |
| *C08L 53/00* | (2006.01) | |
| *C09K 3/10* | (2006.01) | |
| *C08F 214/22* | (2006.01) | |
| *C08F 214/26* | (2006.01) | |
| *C08F 214/28* | (2006.01) | |

(52) U.S. Cl.
CPC .............. *C08L 27/20* (2013.01); *C08L 27/16* (2013.01); *C08L 27/18* (2013.01); *C08L 53/00* (2013.01); *C08L 71/00* (2013.01); *C08L 83/04* (2013.01); *C09K 3/10* (2013.01); *C08F 214/22* (2013.01); *C08F 214/26* (2013.01); *C08F 214/28* (2013.01); *C08F 2500/21* (2013.01); *C08F 2800/20* (2013.01); *C08L 2205/02* (2013.01); *C08L 2205/03* (2013.01); *C08L 2312/00* (2013.01)

(58) Field of Classification Search
CPC .. C08L 27/18; C08L 27/20; C08L 7/00; C08L 27/16; C08L 83/04; C08L 53/00; C08L 71/02; C08L 2205/02; C08L 2205/03; C08L 2312/00; C08K 3/10; C08K 5/0025; C08F 2500/00; C08F 214/21; C08F 214/22; C08F 214/26; C08F 214/28; C08F 2800/20
See application file for complete search history.

(56) References Cited

U.S. PATENT DOCUMENTS

| | | | |
|---|---|---|---|
| 4,746,576 A * | 5/1988 | Ozu et al. ............... | B43L 1/002 428/207 |
| 5,268,405 A | 12/1993 | Ojakaar et al. | |
| 5,554,680 A | 9/1996 | Ojakaar | |
| 5,789,489 A | 8/1998 | Coughlin et al. | |
| 6,503,972 B1 | 1/2003 | Rai et al. | |
| 7,666,948 B2 | 2/2010 | Aizawa et al. | |
| 2006/0148991 A1 | 7/2006 | Aizawa et al. | |
| 2007/0093608 A1 | 4/2007 | Bish et al. | |
| 2010/0216933 A1* | 8/2010 | Wang ..................... | C08L 27/18 524/502 |

FOREIGN PATENT DOCUMENTS

| | | |
|---|---|---|
| CN | 1141050 A | 1/1997 |
| CN | 1800256 A | 7/2006 |
| EP | 1676885 A2 | 7/2006 |
| JP | 01-193349 A | 8/1989 |
| JP | 08-508532 A | 9/1996 |
| JP | 09-509210 A | 9/1997 |

(Continued)

OTHER PUBLICATIONS

Extended European Search Report dated Oct. 5, 2018 issued in European Patent Application No. 16870647.1.
Taiwanese Office Action issued in Application No. 105139488 dated Nov. 7, 2018, with English translation.
Office Action issued in corresponding Korean Patent Application No. 10-2018-7015078, dated Mar. 18, 2019.

(Continued)

*Primary Examiner* — Nathan M Nutter
(74) *Attorney, Agent, or Firm* — McDermott Will & Emery LLP

(57) ABSTRACT

The present invention addresses the problem of reducing the hardness of a molded article obtained by cross-linking a cross-linking elastomer. The problem addressed by the present invention is solved by cross-linking a cross-linking elastomer composition including at least a cross-linking elastomer and a fluorine oligomer (a) not including hydrogen.

22 Claims, 4 Drawing Sheets

(56) References Cited

FOREIGN PATENT DOCUMENTS

| | | |
|---|---|---|
| JP | 2000-044930 A | 2/2000 |
| JP | 2000-502123 A | 2/2000 |
| JP | 2000-119468 A | 4/2000 |
| JP | 2002-69246 A | 3/2002 |
| JP | 2003-327768 A | 11/2003 |
| JP | 2004-307765 A | 11/2004 |
| JP | 2006-206874 A | 8/2006 |
| JP | 2009-513784 A | 4/2009 |
| JP | 4778782 B2 | 9/2011 |
| JP | 2012-519221 A | 8/2012 |
| TW | 200634085 A | 10/2006 |
| WO | 97/19982 A2 | 6/1997 |
| WO | 2010-099057 A2 | 9/2010 |

OTHER PUBLICATIONS

Office Action issued in corresponding Japanese Patent Application No. 2017-553867, dated Jun. 12, 2018.
Office Action issued in correspoding Korean Patent Application No. 10-2018-7015078, dated Jul. 16, 2019.
English Translation of International Preliminary Report on Patentability, dated Jun. 5, 2018 from International Application No. PCT/JP2016/085377, including English translation of Written Opinion of the International Searching Authority (11 pages).
Office Action issued in corresponding Chinese Application No. 201680069779.X, dated Oct. 22, 2019, with English translation.

* cited by examiner

CROSSLINKABLE ELASTOMER COMPOSITION, MOLDED ARTICLE, SEAL MEMBER, PLASMA TREATMENT APPARATUS AND SEMICONDUCTOR MANUFACTURING APPARATUS INCLUDING SAID SEAL MEMBER, AND AGENT FOR DECREASING HARDNESS OF MOLDED ARTICLE, METHOD FOR PRODUCING MOLDED ARTICLE

CROSS REFERENCE

This application is the U.S. National Phase under 35 U.S.C. § 371 of International Application No. PCT/JP2016/085377, filed on Nov. 29, 2016, which claims the benefit of Japanese Application No. 2015-233655, filed on Nov. 30, 2015, the entire contents of each are hereby incorporated by reference.

TECHNICAL FIELD

The present application relates to a crosslinkable elastomer composition for producing a molded article, a molded article obtained by crosslinking said crosslinkable elastomer composition, a seal member, a plasma treatment apparatus and a semiconductor manufacturing apparatus that include said seal member, and an agent for reducing the hardness of a molded article, and a method for producing a molded article.

High stability with regard to various chemical species is required of molded articles such as seal members used in apparatuses employed in environments such as a plasma atmosphere and chemical atmosphere, and molded articles made from fluoroelastomers are mainly used (see Patent Document 1). Gases and chemical solutions having high chemical reactivity have come to be used in high concentrations in these apparatuses for reasons such as increasing efficiency in recent years, and the fact that molded articles made from the fluoroelastomers widely used to date deteriorate severely and cannot be used has become a problem.

Among fluoroelastomers, perfluoroelastomers demonstrate especially good plasma resistance and chemical resistance, and thus are often used in apparatuses used in harsh environments such as the above (see Patent Document 2). Perfluoroelastomers, however, have low hot strength, and there is a risk of molded O-rings breaking during high-temperature treatments.

Mixing a specific uncrosslinked perfluoroelastomer (A) and a specific uncrosslinked elastomer (B) that is incompatible with the uncrosslinked perfluoroelastomer (A) in a certain ratio is known for overcoming this problem (see Patent Document 3).

PRIOR ART DOCUMENTS

Patent Documents

[Patent Document 1] JP Kokai 2000-119468
[Patent Document 2] JP Kokai 2000-044930
[Patent Document 3] JP Patent No. 4778782

SUMMARY OF THE INVENTION

Problem to be Solved by the Invention

When a seal member, which is one example of a molded article, is installed in a plasma treatment apparatus or semiconductor manufacturing apparatus, the sealability of the apparatus can be enhanced by elastic deformation. The crosslinked product described in Patent Document 3 can provide a seal member having excellent plasma resistance and chemical resistance as well as heat resistance and mechanical strength, but its hardness is relatively high. Accordingly, there has been a need for molded articles such as seal members that have properties such as plasma resistance, lower hardness, and flexibility. Nonetheless, no material for forming such a molded article is currently known.

The present application has been contrived to overcome the above problem. It was newly discovered, upon thoroughgoing studies, that the hardness of the molded article obtained by crosslinking the crosslinkable elastomer can be lowered when a hydrogen-free fluorine oligomer (sometimes described simply hereinafter as the "fluorine oligomer") (a) is added to a crosslinkable elastomer.

Specifically, the purpose of the present application is to provide a crosslinkable elastomer composition that includes a fluorine oligomer having the function of lowering the hardness of the molded article, a molded article obtained by crosslinking the crosslinkable elastomer composition, a seal member, a plasma treatment apparatus and a semiconductor manufacturing apparatus that include said seal member, and an agent for reducing the hardness of a molded article, and a method for producing a molded article.

Means for Solving the Problem

The present application relates to the crosslinkable elastomer composition, molded article, seal member, plasma treatment apparatus and semiconductor manufacturing apparatus that include said seal member, and agent for reducing the hardness of a molded article, and method for producing a molded article shown below.

(1) A crosslinkable elastomer composition
    including at least a hydrogen-free fluorine oligomer (a) and a crosslinkable elastomer.
(2) The crosslinkable elastomer composition of (1) above, wherein the crosslinkable elastomer includes at least:
    one elastomer (B) selected from vinylidene fluoride/hexafluoropropene-based copolymers, vinylidene fluoride/hexafluoropropene/tetrafluoroethylene-based copolymers, tetrafluoroethylene/propylene-based copolymers; copolymers obtained by copolymerizing ethylene or perfluoroalkylvinyl ether with these copolymers; block copolymers of vinylidene fluoride/hexafluoropropene/tetrafluoroethylene-based copolymers and tetrafluoroethylene/ethylene alternating copolymers or polyvinylidene fluoride; and silicone rubber,
    and/or
    a perfluoroelastomer (A) containing as copolymer units a perfluoroolefin, a perfluorovinyl ether selected from the group consisting of perfluoro(alkylvinyl) ethers, perfluoro(alkoxyvinyl) ethers, and mixtures thereof, and a curing site monomer.
(3) The crosslinkable elastomer composition of (2) above, wherein
    the crosslinkable elastomer includes the perfluoroelastomer (A),
    and the proportion of the perfluoroelastomer (A) is 99.5 or less when the total weight of the crosslinkable elastomer is taken to be 100.
(4) The crosslinkable elastomer composition of (3) above, wherein the crosslinkable elastomer includes only the elastomer (B) and the perfluoroelastomer (A).

(5) The crosslinkable elastomer composition any one of (1) to (4) above, wherein the proportion of hydrogen-free fluorine oligomer (a) to the crosslinkable elastomer is 0.1-30 wt %.
(6) The crosslinkable elastomer composition of (5) above, wherein the proportion of hydrogen-free fluorine oligomer (a) to the crosslinkable elastomer is 1-15 wt %.
(7) A molded article obtained by crosslinking the crosslinkable elastomer composition of any one of (1) to (6) above.
(8) A seal member in which the molded article of (7) above is in the shape of a seal.
(9) A plasma treatment apparatus including the seal member of (8) above.
(10) A semiconductor manufacturing apparatus including the seal member of (8) above.
(11) An agent for reducing the hardness of a molded article including a hydrogen-free fluorine oligomer (a) as an active ingredient.
(12) A method for producing a molded article that includes
a step for crosslinking a crosslinkable elastomer composition including at least a hydrogen-free fluorine oligomer (a) and a crosslinkable elastomer.

Effect of the Invention

The crosslinkable elastomer composition disclosed in the present application can lower the hardness of the molded article to a greater extent than a composition without the hydrogen-free fluorine oligomer (a) added.

MODE FOR CARRYING OUT THE INVENTION

Figure 1:
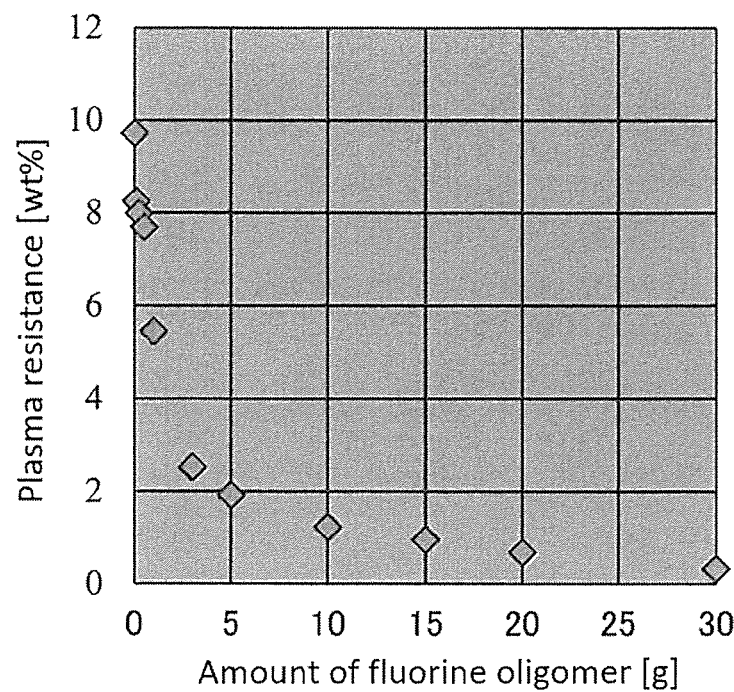
FIG. 1 is a graph representing the evaluation results of the plasma resistance performance of seal members of Examples 1-10 and Comparative Example 1.

The crosslinkable elastomer composition, molded article, seal member, plasma treatment apparatus and semiconductor manufacturing apparatus that include said seal member, and agent for reducing the hardness of a molded article, and method for producing a molded article are described in detail below. Furthermore, in the present specification, the term "crosslinkable elastomer composition" means a composition prior to crosslinking of the crosslinkable elastomer (the "crosslinkable elastomer composition" is sometimes described simply hereinafter as the "composition"). "Crosslinkable" and "uncrosslinked" are also synonymous. A "seal member" means a member crosslinked and cured after the kneaded composition has been formed into a shape suitable for sealing an apparatus or the like. A "molded article" includes in the meaning articles having a shape suited to uses other than sealing in addition to shapes suitable for sealing.

Embodiments of the composition that is the raw material of the molded articles and seal members (sometimes described collectively hereinafter as "molded articles") include at least the fluorine oligomer (a) and a crosslinkable elastomer.

The fluorine oligomer (a) is an oligomer constituted from the elements C, F, and O; examples include fluorine oligomers (a) that include the following basic skeletons.

[Chemical formula 1]

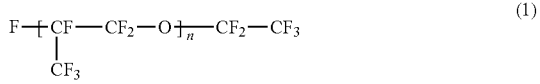

(1)

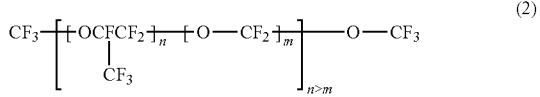

(2)

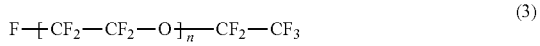

(3)

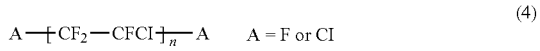

(4)

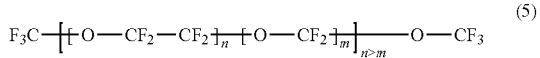

(5)

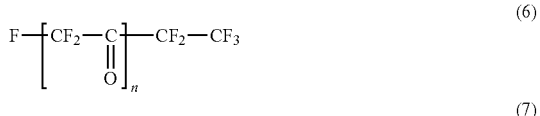

(6)

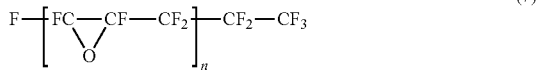

(7)

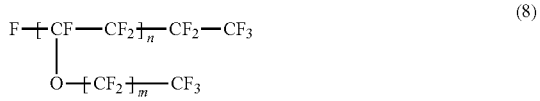

(8)

n > m ≥ 0

In fluorine oligomers (a) represented by the above formulas (1)-(8), the molecular weight varies depending on the numbers of n and m. The higher the molecular weight, the higher the viscosity and boiling point generally become. Synthesized products of the fluorine oligomers (a) including the above basic skeletons may be used, or those marketed as fluorine-based solvents (oils and greases) may be used. There are known to be various grade products of marketed fluorine oligomers (a) having different properties such as viscosity depending on the numbers of n and m. Examples include the Krytox (registered trademark) series manufactured by DuPont; the Fomblin (registered trademark) series and Galden (registered trademark) series of Solvay; and the Demnum series manufactured by Daikin. Furthermore, the above products and skeletons are offered merely as examples; other skeletons and products are acceptable as long as they do not include hydrogen. Also, as shown in formulas (1)-(8) above, the fluorine oligomers (a) include ether bonds in the basic skeleton and do not crosslink in the crosslinkable elastomer crosslinking step discussed below. On the other hand, the uncrosslinked perfluoroelastomer (A) of Patent Document 3 includes an ether bond in a side chain, and the basic skeleton differs. It also differs in that the perfluoroelastomer (A) itself also crosslinks in the crosslinkable elastomer crosslinking step.

Novec manufactured by 3M is a known fluorine oligomer that includes hydrogen in the basic skeleton. However, as shown in the examples and comparative examples discussed below, when a fluorine oligomer (a) that does not include hydrogen in the basic skeleton is added to a crosslinkable elastomer the hardness of the molded article is lowered and, depending on the type of crosslinkable elastomer, the plasma resistance of the molded article can be improved. The hardness of the molded article can also be lowered and the plasma resistance inherent to the crosslinkable elastomer is not compromised when a hydrogen-free fluorine oligomer (a) is added to a crosslinkable elastomer having excellent plasma resistance. In sum, the hardness of the molded article obtained by crosslinking the crosslinkable elastomer is lowered and the plasma resistance can be improved or maintained. On the other hand, the plasma resistance of the molded article cannot be improved when a fluorine oligomer that includes hydrogen in the basic skeleton is added. Therefore, fluorine oligomers (a) that do not include hydrogen in the basic skeleton are preferred.

The molecular weight of the fluorine oligomer (a) is not particularly restricted as long as the hardness of the molded article decreases and plasma resistance performance is obtained. However, kneading into the crosslinkable elastomer becomes difficult when the viscosity is too low, and shear force is necessary when the viscosity is high. Therefore, the molecular weight may be adjusted suitably so as to fall within a range suitable for kneading.

The crosslinkable elastomer is not particularly restricted as long as the elastomer is an uncrosslinked variety for industrial use. Examples include isoprene rubber, butadiene rubber, styrene-butadiene rubber, chloroprene rubber, nitrile rubber, polyisobutylene, ethylene-propylene rubber, chlorosulfonated polyethylene, acrylic rubber, fluorine rubber, epichlorohydrin rubber, urethane rubber, and silicone rubber. The rubbers given as examples may be used individually or in mixture. The crosslinkable elastomers given as examples may be selected as is appropriate to the use such as for water tightness or air tightness, the apparatus and the environment in which they are used, etc.

When the molded article is used in an apparatus that requires plasma resistance such as a plasma treatment apparatus or semiconductor manufacturing apparatus, it is preferable to use perfluoroelastomers (A), which have excellent plasma resistance among crosslinkable elastomers and/or fluorine rubber or silicone rubber (fluorine rubber and silicone rubber are sometimes referred to collectively hereinafter as "elastomer (B)") or to include them as a portion of the crosslinkable elastomer.

Examples of fluorine rubbers include vinylidene fluoride/hexafluoropropene-based copolymers, vinylidene fluoride/hexafluoropropene/tetrafluoroethylene-based copolymers, and tetrafluoroethylene/propylene-based copolymers. Also, ethylene or perfluoroalkylvinyl ether may also be copolymerized to these copolymers. Fluorine-based thermoplastic elastomers which are block copolymers of fluorine rubber (vinylidene fluoride/hexafluoropropene/tetrafluoroethylene-based copolymers) and fluorine resin (tetrafluoroethylene/ethylene alternating copolymers and polyvinylidene fluoride) can also be used. These fluorine rubbers can also be mixed.

Examples of silicone rubbers include methyl vinyl silicone rubber, methyl vinyl phenyl silicone rubber, and fluorosilicone rubber. These silicone rubbers may also be mixed.

The hardness of the molded article obtained from the elastomer (B) is lowered and the plasma resistance can also be improved by adding the fluorine oligomer (a) to the elastomer (B). Therefore, the crosslinkable elastomer component of molded articles that require plasma resistance may be elastomer (B) alone. On the other hand, when chemical resistance and/or heat resistance performance is required in addition to plasma resistance, an uncrosslinked perfluoroelastomer (A) alone may be used as the crosslinkable elastomer component. Alternatively, the uncrosslinked perfluoroelastomer (A) and uncrosslinked elastomer (B) may be mixed.

Examples of the uncrosslinked perfluoroelastomer (A) include perfluoroelastomers containing copolymer units of perfluoroolefins, perfluorovinyl ethers selected from the group consisting of perfluoro(alkylvinyl) ethers, perfluoro(alkoxyvinyl) ethers, and mixtures thereof, and curing site monomers.

Examples of curing site monomers include curing site monomers that include iodine or bromine and curing site monomers that include a cyano group. Examples of curing site monomers that include iodine or bromine include $CF_2=CF(CF_2)_nI$, $CF_2=CF(CF_2)_nBr$, and $I(CF_2)_nI$. Examples of curing site monomers that include a cyano group include cyano-group-containing perfluorovinyl ether; e.g., $CF_2=CFO(CF_2)_nOCF(CF_3)CN$ (n: 2-4), $CF_2=CFO(CF_2)_nCN$ (N: 2-12), $CF_2=CFO[CF_2CF(CF_3)O]_m(CF_2)_nCN$ (n: 2, m: 1-5), $CF_2=CFO[CF_2CF(CF_3)O]_m(CF_2)_nCN$ (n: 1-4, m: 1-2), and $CF_2=CFO[CF_2CF(CF_3)O]_nCF_2CF(CF_3)CN$ (n: 0-4).

When a perfluoroelastomer (A) and another crosslinkable elastomer component are mixed, the proportion of the perfluoroelastomer (A) is preferably 99.5 or less, taking the total weight of the crosslinkable elastomer to be 100. Since the plasma resistance of the molded article can be improved by adding the fluorine oligomer (a) to crosslinkable elastomers other than perfluoroelastomers (A), plasma resistance performance can be exhibited even if the amount of perfluoroelastomer (A) added is reduced. The proportion of perfluoroelastomer (A) may be 99.5 or less, taking the total weight of the elastomer (B) and perfluoroelastomer (A) to be 100, even when only the elastomer (B) and perfluoroelastomer (A) are used as the crosslinkable elastomer. A filler is sometimes added to the molded article (crosslinkable elastomer composition) to improve the plasma resistance or heat resistance, but the hardness of the molded article generally increases when a filler is added. Nonetheless, the hardness of the molded articles (crosslinkable elastomer compositions) shown in the embodiments can be brought lower than molded articles without fluorine oligomer (a) added by adding a fluorine oligomer (a) to the crosslinkable elastomer. Therefore, because a filler can also be added, the degree of freedom of blending the raw materials of the molded article (crosslinkable elastomer composition) increases in commensurate fashion with the amount of decrease in the hardness obtained by adding a fluorine oligomer (a).

Furthermore, the raw material unit cost of the fluorine oligomer (a) is approximately $1/100^{th}$ that of the perfluoroelastomer (A). Since plasma resistance can be imparted by adding a fluorine oligomer (a) to the crosslinkable elastomer, some or all of the perfluoroelastomer (A) can be replaced by another crosslinkable elastomer, and the raw material cost of the molded article can also be lowered.

The proportion of fluorine oligomer (a) to crosslinkable elastomer is not particularly restricted as long as the hardness can be lowered. When the plasma resistance of the molded article obtained is to be improved in addition to lowering the hardness as well, the proportion is not particularly restricted as long as it is within the range at which the plasma resistance can improve. When the amount of fluorine oligomer (a) added decreases, the hardness is not lowered, and the plasma resistance cannot be improved. Therefore, the proportion of fluorine oligomer (a) to crosslinkable elastomer is preferably 0.1 wt % or greater, more preferably 1 wt % or greater. On the other hand, when the amount of fluorine oligomer (a) added increases, the hardness decreases and the plasma resistance performance improves. Therefore, there is no particular upper limit to the amount of fluorine oligomer (a) added from the viewpoint of lowering the hardness and the plasma resistance performance. However, in order to produce a molded article, a step for molding by crosslinking the crosslinkable elastomer is required after the fluorine oligomer (a) and crosslinkable elastomer has been kneaded. A greater amount of fluorine oligomer added corresponds to a longer molding time, and lowered production efficiency. Therefore, the amount of fluorine oligomer (a) added relative to the crosslinkable elastomer is preferably 30 wt % or less, more preferably 15 wt % or less, from the viewpoint of the production efficiency of molded articles. Consequently, the amount of fluorine oligomer (a) added relative to the crosslinkable elastomer is preferably 0.1-30 wt %, more preferably 1-15 wt %.

Furthermore, the above proportion of fluorine oligomer (a) to crosslinkable elastomer is the proportion in molded articles. The proportion of fluorine oligomer (a) to crosslinkable elastomer may be the same as above in compositions as well, but when the composition is used as a master batch and additional crosslinkable elastomer and the like are added and kneaded before molding, the proportion of fluorine oligomer (a) may be outside the above range. Also, the composition may include the crosslinking agent, co-crosslinking agent, filler, and the like discussed below as needed. The crosslinking agent, co-crosslinking agent, filler, and the like may be added as needed in the step that produces the molded articles.

The crosslinkable elastomer may be crosslinked by using known methods such as heating and ionizing radiation. In the seal member described in Patent Document 3, however, the perfluoroelastomer (A) and elastomer (B) each become crosslinked macromolecules by crosslinking the uncrosslinked perfluoroelastomer (A) and elastomer (B) after kneading. On the other hand, in the molded articles shown in the embodiments, the crosslinkable elastomer is crosslinked, but the fluorine oligomer (a) remains a fine particulate aggregate without crosslinking. The molded articles and seal members shown in the embodiments therefore differ as products from the seal member described in Patent Document 3.

When the crosslinkable elastomer is crosslinked by heating, the crosslinking reaction is advanced by heating at a temperature of about 150° C., although it varies depending on the type of crosslinkable elastomer. Secondary crosslinking is also carried out at a temperature of 150-250° C. as needed. In this case, the fluorine oligomer (a) disperses as a fine particulate aggregate in the crosslinked elastomer of crosslinkable elastomer as described above without crosslinking. When the boiling point of the fluorine oligomer (a) is low, however, there is a possibility of evaporating during crosslinking by heating. It is therefore preferable to use a fluorine oligomer (a) having a boiling point higher than the heating temperature when the crosslinking reaction is advanced by heating. Since fluorine oligomers (a) generally have a higher boiling point when the molecular weight is higher, a fluorine oligomer (a) of relatively high molecular weight may be used.

On the other hand, when crosslinking by a method that does not rely on heating, such as ionizing radiation, a fluorine oligomer (a) having a boiling point lower than in crosslinking by heating can be used. In this case, a fluorine oligomer having a boiling point higher than the temperature of the ionizing radiation exposure environment may be used.

Crosslinking by an organic peroxide can be given as an example of a method of crosslinking the crosslinkable elastomer. Ones known for crosslinking crosslinkable elastomers can be used as the organic peroxide crosslinking agent. Examples include dicumyl peroxide, di-t-butylperoxydiisopropylbenzene, 2,5-dimethyl-2,5-di(t-butylperoxy) hexane, and the like.

Materials known as crosslinking crosslinkable elastomers can be used as the co-crosslinking agent. Examples include triallyl isocyanurate, triallyl cyanurate, triallyl trimellilate [sic; trimellitate], N,N'-m-phenylenedimaleimide, trimethylolpropane trimethacrylate, and the like. Acrylate- and methacrylate-based monomers and the like can also be used.

Also, the embodiment of molded articles may include carbon black, silicon carbide (SiC), calcium carbonate, silica, alumina, silicate minerals (such as mica and talc), barium sulfate, organic reinforcing materials and other such fillers, antioxidants, and the like within the range that does not harm the effects. Furthermore, the particle size of the filler is nanoparticles of 10-500 nm, although it varies by type, and handling is difficult due to scattering, etc. in that form. Therefore, a granulated filler may be used when adding the filler. Granulation may be performed using a known granulation technique, and granulated commercial products may be used. The bulk density of the granulated filler is preferably about 0.05-5.0 $g/cm^3$. When the bulk density is less than 0.05 $g/cm^3$, the effect of granulation becomes difficult to obtain. When the bulk density is greater than 5.0 $g/cm^3$, uniform dispersion becomes difficult when kneading the filler into the crosslinkable elastomer.

For molded articles, a composition is produced first by kneading the fluorine oligomer (a), crosslinkable elastomer, organic peroxide crosslinking agent, and co-crosslinking agent. Furthermore, when a composition including only the fluorine oligomer (a) and crosslinkable elastomer is used as a master batch, the crosslinkable elastomer, organic peroxide crosslinking agent, and co-crosslinking agent may be added as is appropriate during kneading. A filler and the like may also be kneaded in as needed. Known kneading machines such as an open roll, kneader, Banbury mixer, twin-screw extruder, and the like may be used in kneading, but options are not limited to these. The composition obtained takes on a structure in which the fluorine oligomer (a) is dispersed in the crosslinkable elastomer. Furthermore, the perfluoroelastomer (A) which is the crosslinkable elastomer component takes on an islands-in-the-sea structure in accordance with the amount added. Therefore, the fluorine oligomer (a) takes on a structure dispersed in the islands-in-the-sea structure.

A molded article is obtained by crosslinking the above composition. The crosslinking method can accord with ordinary methods of molding by peroxide crosslinking. Generally, a predetermined amount of the composition is filled into a mold of the desired shape and hot pressed. Secondary crosslinking may be conducted as needed for 1-32 hours at 150-250° C. in an oven.

When ionizing radiation is used instead of hot pressing, any electromagnetic waves or particle beams capable of ionizing air directly or indirectly can be applied as the type of ionizing radiation. Examples include, but are not limited to, α-rays, β-rays, γ-rays, deuteron beam, proton beam, neutron beam, x-rays, and electron beam. These types of radiation may also be used in combination, but γ-rays are used especially suitably. γ-Rays can crosslink the crosslinkable elastomer uniformly due to their high penetrating power.

Furthermore, the dispersion of the fluorine oligomer (a) in the composition is maintained basically unchanged in the molded article after crosslinking as well. Therefore, aggregates of the fluorine oligomer (a) added as a raw material are dispersed in the crosslinked product of the crosslinkable elastomer in the molded article. The fluorine oligomer (a) preferably disperses so that the average particle size in the crosslinked product of the crosslinkable elastomer is 10 μm or less, more preferably 2 μm or less. The average particle size can be adjusted by the kneading time, kneading speed, and the like.

Examples of the shape of the seal member (sometimes described hereinafter as the "seal shape") include any shape that accords with the use, such as a sheet, rod, ring, or various complex block shapes. Examples of the shape of the molded article include, in addition to the above seal shapes, a container, plate, holder of an article that requires plasma treatment, and the like. For example, when an article that requires plasma treatment is placed in a chamber, the desired article can be plasma treated in the chamber by producing a holder of a shape that holds the article, exposes the parts that require plasma treatment, and covers parts that do not require plasma treatment.

The seal member undergoes elastic deformation easily since the hardness is lowered when the fluorine oligomer (a) is added, and a molded article (seal member) having excellent sealability can be produced. It is therefore useful in seal members and the like for apparatus and piping. Also, as will be clarified by the examples discussed below, the addition of the fluorine oligomer (a) can also improve the plasma resistance of the seal member.

Given the above properties, the molded article is suitable for use in harsh environments such as in high temperatures and vacuums. Therefore, it can be incorporated as a seal member in plasma treatment apparatus and semiconductor manufacturing apparatus that are exposed to plasma. Known plasma treatment apparatus and semiconductor manufacturing apparatus can be used as long as they use seal members. Furthermore, the type of plasma gas is not an issue. For example, $O_2$, $CF_4$, $O_2+CF_4$, $H_2$, $CHF_3$, $CH_3F$, $CH_2F_2$, $Cl_2$, $O_2F_6$, $BCl_3$, $NF_3$, $NH_3$, and the like are common in plasma treatment apparatus. The molded article has excellent resistance to all types of plasma. Therefore, the molded article is not for a specific plasma.

As described above, due to being able to lower the hardness of molded articles obtained by crosslinking a crosslinkable elastomer, the fluorine oligomer (a) can be used as an agent for reducing the hardness of molded articles. When the fluorine oligomer (a) is used as an agent for reducing the hardness of molded articles, a synthesized or commercial fluorine oligomer (a) may be used without further modification. Since the fluorine oligomer (a) has a viscosity close to that of a fluid even on its own due to its low molecular weight, the purity of a commercial fluorine oligomer (a) is 100%. Furthermore, the fluorine oligomer (a) dissolved in a solvent or kneaded into a crosslinkable elastomer or the like may be used as an agent to decrease hardness as needed. The form is not particularly restricted as long as a fluorine oligomer (a) is included as an active ingredient.

Examples are presented below, and specific embodiments of the present application are explained. However, these are not intended to limit or restrict the scope of the embodiments disclosed in the present application.

EXAMPLES

[Effect of the Amount of Hydrogen-Free Fluorine Oligomer Added]

Examples 1-10 and Comparative Example 1

<Raw Materials>
The following products were used in the raw materials.
Fluorine oligomer (a): Krytox 143AD manufactured by DuPont, molecular weight 7480
Elastomer (B): Solvay Specialty Polymers Japan K.K., Fluorine Rubber P959
Co-crosslinking agent: TAIC manufactured by Nippon Kasei
Crosslinking agent: 25B manufactured by NOF Corporation
Filler: MT Carbon N990 manufactured by Cancarb Limited <Production of a Kneaded Composition>
The elastomer (B), filler, co-crosslinking agent, crosslinking agent, and fluorine oligomer were introduced into a biaxial open roll to make the blends shown in Table 1 and kneaded. The greater the amount of fluorine oligomer added, the longer the kneading time was. The kneading time was adjusted so that the size of the fluorine oligomer was about the same.

<Molding Temperature and Molding Time>
A suitable amount of the above kneaded composition was first introduced into an MDR apparatus (manufactured by Flexsys, Rheometer MDR 2000). Testing was then performed for one hour at 150° C., and data on Tc90 to serve as an indicator of the molding time were obtained.

<Molding and Secondary Crosslinking (O Ring Production)>
A suitable amount of the kneaded composition was introduced into a mold for 0 ring molding that had been heated to 150° C. Next, each sample was molded for 1.2 times the time decided based on the Tc90 calculated by MDR. After molding had been completed, the molded article was removed from the mold, and unnecessary burrs were removed. Secondary crosslinking was then conducted for four hours in a 180° C. oven, and seal members were produced.

TABLE 1

| Raw material (amount added: g) | Comparative example 1 | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Fluorine oligomer (a) | 0 | 0.1 | 0.25 | 0.5 | 1 | 3 | 5 | 10 | 15 | 20 | 30 |
| Elastomer (B) | 100 | 100 | 100 | 100 | 100 | 100 | 100 | 100 | 100 | 100 | 100 |

TABLE 1-continued

| Raw material (amount added: g) | Comparative example 1 | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Co-crosslinking agent | 2 | 2 | 2 | 2 | 2 | 2 | 2 | 2 | 2 | 2 | 2 |
| Crosslinking agent | 1 | 1 | 1 | 1 | 1 | 1 | 1 | 1 | 1 | 1 | 1 |
| Filler | 15 | 15 | 15 | 15 | 15 | 15 | 15 | 15 | 15 | 15 | 15 |

(1) Evaluation of Plasma Resistance

Test pieces were exposed to plasma under the following conditions, and the plasma resistance was evaluated based on the weight loss before and after exposure.

Apparatus: Surface wave plasma etching apparatus manufactured by Shinko Seiki

Test piece: 3.53 diameter×30 mm (cut article of AS568-214 size)

Gas: $O_2+CF_4$

Treatment pressure: 133 Pa

Output: 3 kW

Exposure time: 2 hours

Weight loss (wt %)=[(weight before plasma exposure−weight immediately after plasma exposure)/(weight before plasma exposure)]×100

FIG. 1 is a graph representing the results of evaluation of plasma resistance. As is evident from FIG. 1, the plasma resistance performance improved even when the proportion of fluorine oligomer (a) added to the elastomer (B) was 0.1 wt %. The plasma resistance performance improved rapidly up to an added amount of fluorine oligomer (a) of 3 wt %, and the plasma resistance performance improved gradually thereafter as the amount of fluorine oligomer (a) added increased.

Figure 2:
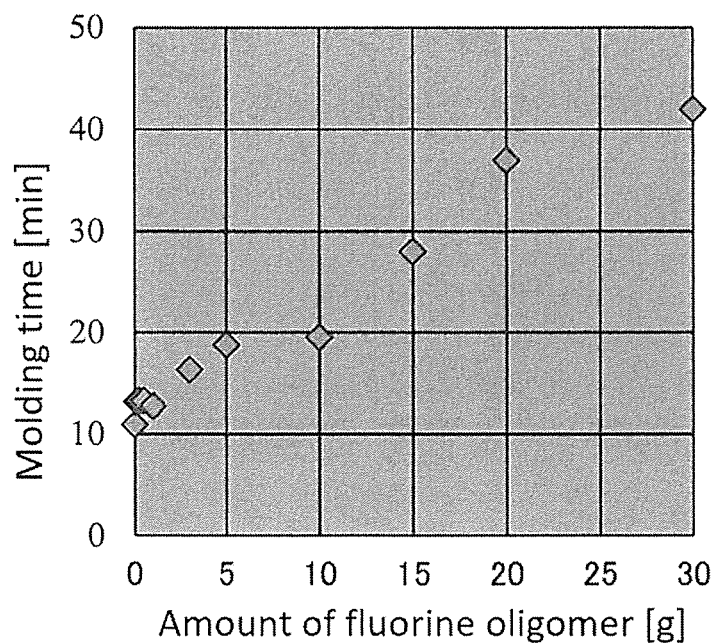
FIG. 2 is a graph of the molding time for seal members of Examples 1-10 and Comparative Example 1 decided based on Tc90 calculated by MDR.

FIG. 2 is a graph of the molding time. As is evident from FIG. 2, the larger the amount of fluorine oligomer (a) added, the more the molding time increased.

(2) Measurement of Fluorine Oligomer (a) in the Seal Member

Figure 3:
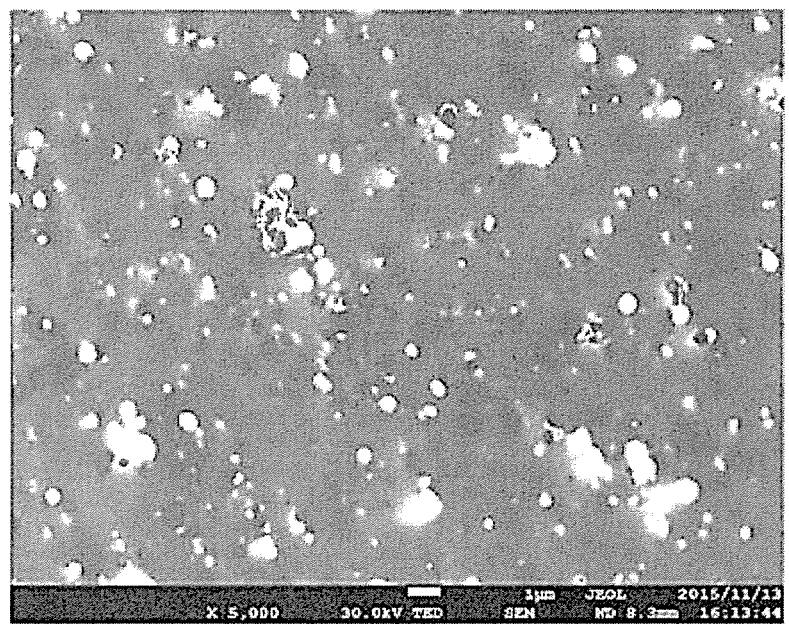
FIG. 3, which is a photograph substituted for a drawing, is a transmission electron micrograph of a test piece of Example 5.

A section was taken from a test piece of Example 5, and a transmission electron micrograph was photographed using a transmission electron microscope ("JEM-2000X" manufactured by JEOL Ltd.). FIG. 3 is the photograph taken. The white dots in the photograph are fine particulate aggregates of the fluorine oligomer (a). As is evident from the photograph, aggregates of the fluorine oligomer (a) were confirmed to be dispersed in the seal member. The average particle size of the aggregates in the photograph was 0.4 µm. Furthermore, the particle size was taken to be the maximum length among the diameters that pass through the center of gravity of a target white dot and connect two target dots on the outer periphery.

[Effect of Type of Fluorine Oligomer]

Examples 11-19

Next, a test was conducted that varied the type of fluorine oligomer, taking the blend of raw materials of Example 5 as the base. The types and molecular weights of the fluorine oligomers used in Examples 11-19 and the blend of raw materials were as shown in Table 2. Also, the test procedure was the same as in the above <Kneaded composition>, <Molding temperature and molding time>, <Molding and secondary crosslinking (O ring production)>, and the plasma resistance was evaluated by the same procedure as in "(1) Plasma resistance evaluation" above.

TABLE 2

| Raw material (amount added: g) | | Comparative example 1 | Example 11 | Example 12 | Example 13 | Example 14 | Example 15 | Example 16 | Example 5 | Example 17 | Example 18 | Example 19 |
|---|---|---|---|---|---|---|---|---|---|---|---|---|
| Fluorine oligomer (a) | Amount added | 0 | 3 | 3 | 3 | 3 | 3 | 3 | 3 | 3 | 3 | 3 |
| | Manufacturer and type | — | Solvay Galden HT55 | Solvay Galden HT135 | Solvay Galden HT200 | DuPont Krytox 143AB | DuPont Krytox 143AC | Solvay Fomblin YR1500 | DuPont Krytox 143AD | Daikin Demnum S200 | Solvay Fomblin M30 | Solvay Fomblin M60 |
| | Molecular weight | — | 340 | 610 | 870 | 3830 | 5940 | 6900 | 7480 | 8200 | 16000 | 18700 |
| Elastomer (B) | | 100 | 100 | 100 | 100 | 100 | 100 | 100 | 100 | 100 | 100 | 100 |
| Co-crosslinking agent | | 2 | 2 | 2 | 2 | 2 | 2 | 2 | 2 | 2 | 2 | 2 |
| Crosslinking agent | | 1 | 1 | 1 | 1 | 1 | 1 | 1 | 1 | 1 | 1 | 1 |
| Filler | | 15 | 15 | 15 | 15 | 15 | 15 | 15 | 15 | 15 | 15 | 15 |

Based on the results shown in FIGS. 1 and 2, the amount of fluorine oligomer (a) added to elastomer (B) should be the 0.1-30 wt % shown in Examples 1-10 from the viewpoint of imparting plasma resistance performance to the elastomer (B). On the other hand, it became evident that the amount of fluorine oligomer added to the elastomer (B) is more preferably about 1-15 wt % when one considers the plasma resistance and molding time; i.e., the production efficiency in relation to the amount of fluorine oligomer (a) added.

Figure 4:
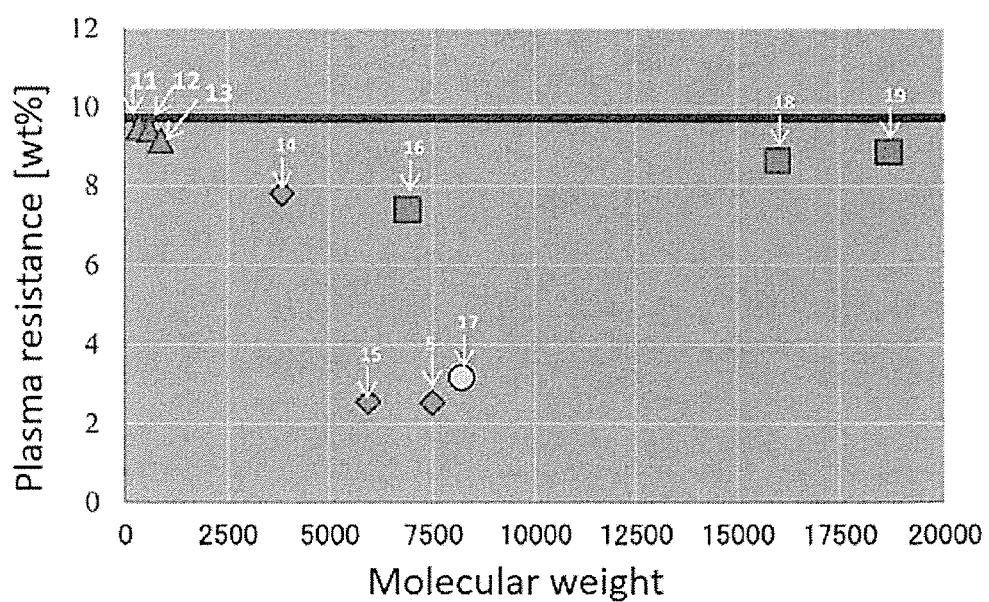
FIG. 4 is a graph representing the evaluation results of the plasma resistance performance of seal members of Examples 5, 11-19 and Comparative Example 1.

FIG. 4 is a graph representing the results of evaluation of the plasma resistance performance of the seal members of Examples 5, 11-19 and Comparative Example 1. The white numbers in the figure are the example numbers. As is evident from FIG. 4, the plasma resistance performance was improved by adding the fluorine oligomer (a), regardless of the manufacturer or type. Furthermore, differences in plasma resistance performance were seen depending on type of fluorine oligomer and the molecular weight, even within the same series. Therefore, a suitable type of fluorine oligomer (a) may be used during production.

[Effect of Different Crosslinking Methods on Plasma Resistance Performance]

Examples 20-23 and Comparative Example 2

The seal members shown in the above Examples 1-19 were crosslinked by heating, but a test was conducted of the plasma resistance when elastomer (B) was crosslinked by γ-rays.

Using the blends and materials shown in Table 3, compositions were produced by the same procedure as in <Kneaded composition> above and molded into sheets. Next, a γ-ray dose of 120 kGy was applied using a γ-ray irradiation apparatus (Radia Industry Co., Ltd.). The crosslinked seal member was evaluated by the same procedure as in "(1) Plasma resistance evaluation" above.

Also, using the combinations and raw materials shown in Table 3 in order compare γ-ray crosslinking and heat-induced crosslinking, seal members were produced by the same procedure as in the above <Kneaded composition>, <Molding temperature and molding time>, <Molding and secondary crosslinking (O ring production)>, and the plasma resistance was evaluated by the same procedure as in "(1) Plasma resistance evaluation" above.

TABLE 3

| | | | Comparative example 2 | Example 20 | Example 21 | Example 22 | Example 23 |
|---|---|---|---|---|---|---|---|
| Raw material Amount added (g) | Fluorine oligomer (a) | Amount added | 0 | 3 | 3 | 10 | 20 |
| | | Manufacturer and type | — | DuPont Krytox 143AB | DuPont Krytox 143AD | DuPont Krytox 143AD | DuPont Krytox 143AD |
| | | Molecular weight | — | 3830 | 7480 | 7480 | 7480 |
| | Elastomer (B) | | 100 | 100 | 100 | 100 | 100 |
| | Co-crosslinking agent | | 2 | 2 | 2 | 2 | 2 |
| | Crosslinking agent | | 1 | 1 | 1 | 1 | 1 |
| | Filler | | 15 | 15 | 15 | 15 | 15 |
| Plasma resistance | Uncrosslinked product/γ-ray application (wt %) | | 11.20 | 10.51 | 3.59 | 1.87 | 1.26 |
| | Heat molded product (wt %) | | 9.72 | 7.81 | 2.53 | 1.23 | 0.68 |

As is evident from Table 3, although the plasma resistance performance is somewhat inferior when the elastomer (B) is crosslinked by γ-rays to when crosslinked by heat, it was understood that adequate plasma resistance performance is obtained by adjusting the molecular weight and amount added.

Based on the above results, it became evident that plasma resistance performance is obtained by adding a fluorine oligomer (a), regardless of the method of crosslinking of the elastomer (B). Therefore, a wide range of fluorine oligomers (a) can be used in accordance with the temperature during crosslinking of the elastomer (B).

[Effect when Elastomer (B) and Perfluoroelastomer (A) are Mixed]

Examples 24-29 and Comparative Example 3

Next, a test was conducted that mixed elastomer (B) and a perfluoroelastomer (A), which can impart chemical resistance performance, as crosslinkable elastomers.

Perfluoroelastomer (A): Dai-EL Perflow GA-15 manufactured by Daikin Industries, Ltd. was used in addition to the same raw materials as in. Examples 1-10. The raw material blends were as in Table 4. The test procedure was the same as in the above <Kneaded composition>, <Molding temperature and molding time>, <Molding and secondary crosslinking (O ring production)>, and the plasma resistance was evaluated by the same procedure as in "(1) Plasma resistance evaluation" above.

TABLE 4

| Raw material (amount added: g) | Comparative example 3 | Example 24 | Example 25 | Example 26 | Example 27 | Example 28 | Example 29 |
|---|---|---|---|---|---|---|---|
| Fluorine oligomer (a) | 0 | 1 | 2 | 3 | 4 | 5 | 6 |
| Perfluoro-elastomer (A) | 5 | 5 | 5 | 5 | 5 | 5 | 5 |
| Elastomer (B) | 95 | 95 | 95 | 95 | 95 | 95 | 95 |
| Co-crosslinking agent | 2 | 2 | 2 | 2 | 2 | 2 | 2 |
| Crosslinking agent | 1 | 1 | 1 | 1 | 1 | 1 | 1 |
| Filler | 15 | 15 | 15 | 15 | 15 | 15 | 15 |

Figure 5:
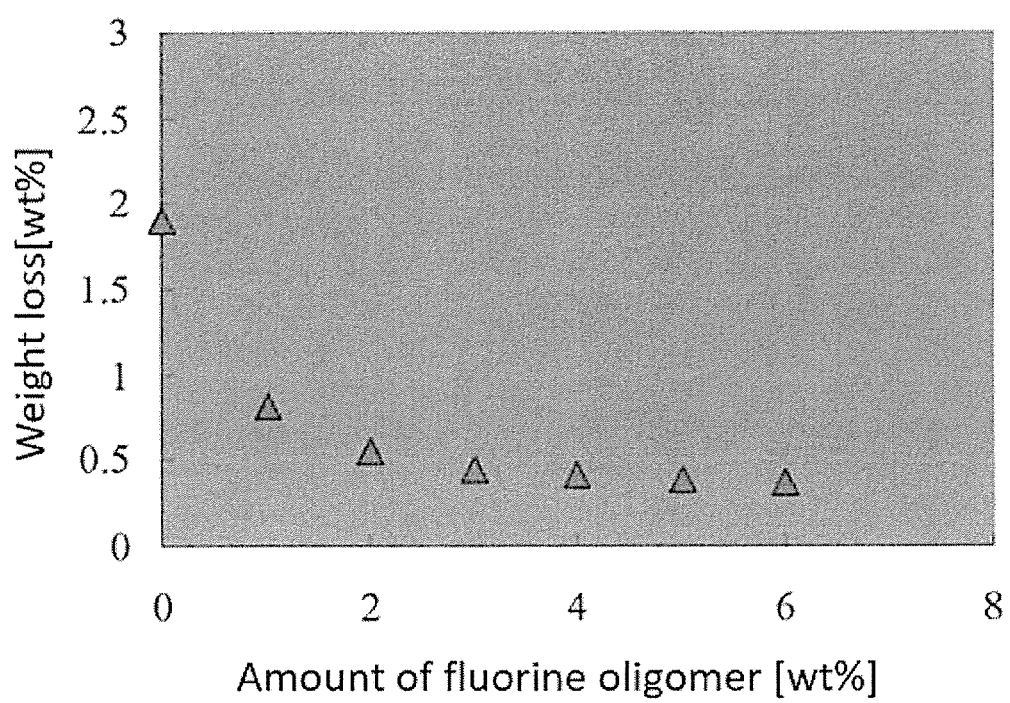
FIG. 5 is a graph representing the evaluation results of the plasma resistance performance of seal members of Examples 24-29 and Comparative Example 3.

FIG. 5 is a graph representing the evaluation results of plasma resistance performance. As is evident from FIG. 5, the larger the amount of fluorine oligomer (a) added, the more the plasma resistance performance improved even when elastomer (B) and perfluoroelastomer (A) were mixed. Based on the above results, the plasma resistance performance can be improved and there are no negative interactions even when a fluorine oligomer (a) is added to a crosslinkable elastomer that mixes an elastomer (B) and perfluoroelastomer (A). Therefore, it became evident that a perfluoroelastomer (A) may be added when chemical resistance performance and the like are required.

Figure 6:
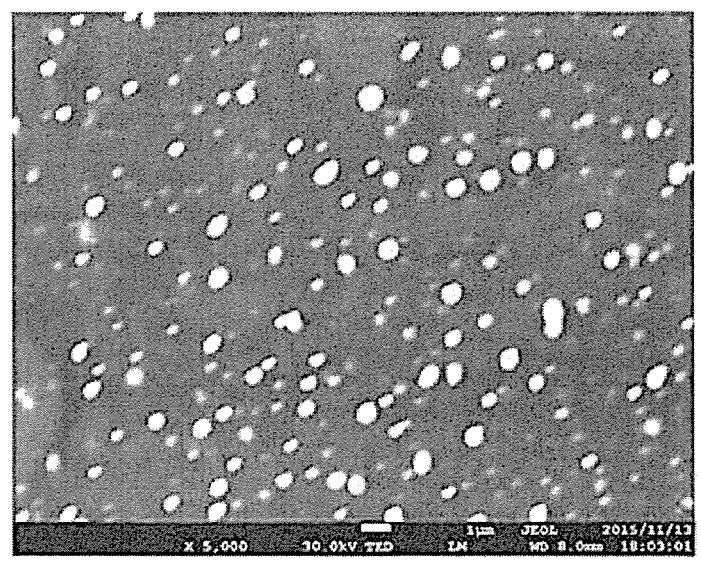
FIG. 6, which is a photograph substituted for a drawing, is a transmission electron micrograph of a test piece of Example 27.

FIG. 6 is a photograph taken by the same procedure as in "(2) Measurement of fluorine oligomer (a) in the seal member" using a section taken from a test piece of Example 27. The fluorine oligomer (a) and perfluoroelastomer (A) are white dots in the photograph, but it is difficult to distinguish the two from the photograph. As is evident from the photograph, it became clear that the fluorine oligomer (a) and perfluoroelastomer (A) disperse even when added to elastomer (B) simultaneously since the small, white dots dispersed without aggregating in the elastomer (B).

[Plasma Resistance Performance when Fluorine Oligomer Containing Hydrogen was Added]

Comparative Examples 1, 4-7

Next, a test was conducted of the effects when a fluorine oligomer containing hydrogen was added instead of the hydrogen-free fluorine oligomer (a). The test studied the plasma resistance performance by the same procedure as above in «Examples 1-10 and Comparative example 1» except that the blends shown in Table 5 below served as the raw materials. The weight loss (wt %) of each comparative example is also shown in Table 5.

TABLE 5

|  |  |  | Comparative example 1 | Comparative example 4 | Comparative example 5 | Comparative example 6 | Comparative example 7 |
|---|---|---|---|---|---|---|---|
| Raw material Amount added (g) | Fluorine oligomer (a) | Amount added | 0 | 3 | 3 | 3 | 3 |
|  |  | Manufacturer and type | — | 3M Novec 7000 | 3M Novec 7100 | 3M Novec 7200 | 3M Novec 7300 |
|  | Elastomer (B) |  | 100 | 100 | 100 | 100 | 100 |
|  | Co-crosslinking agent |  | 2 | 2 | 2 | 2 | 2 |
|  | Crosslinking agent |  | 1 | 1 | 1 | 1 | 1 |
|  | Filler |  | 15 | 15 | 15 | 15 | 15 |
| Hardness |  |  | 67.5 | 65.9 | 66.0 | 64.1 | 62.6 |
| Plasma resistance | Weight loss (wt %) |  | 9.72 | 9.93 | 9.91 | 9.74 | 9.89 |

As shown in Table 5, although a decrease in hardness was seen, no improvement of the plasma resistance performance was seen when a fluorine oligomer containing hydrogen was added, and the results were basically the same as when no fluorine oligomer was added. Based on the above results, it became evident that the fluorine oligomer does not exhibit the function of protecting the elastomer (B) from plasma when it contains hydrogen. Therefore, hydrogen-free fluorine oligomers (a) were confirmed to be preferred over fluorine oligomers containing hydrogen from the viewpoint of improving the plasma resistance in addition to the viewpoint of lowering the hardness of the molded article.

[Relationship Between Amount of Fluorine Oligomer (a) Added and Hardness]

The hardness of the seal members produced in Examples 1-10 was measured by setting the molded article (O ring) in a Micro Rubber Hardness Meter (model: HPEII Shore AM/M) manufactured by Bareiss. Furthermore, multiple seal members with varying amounts of perfluoroelastomer (A) added were also produced for the sake of comparison, and the hardness was studied by the same procedure.

Figure 7:
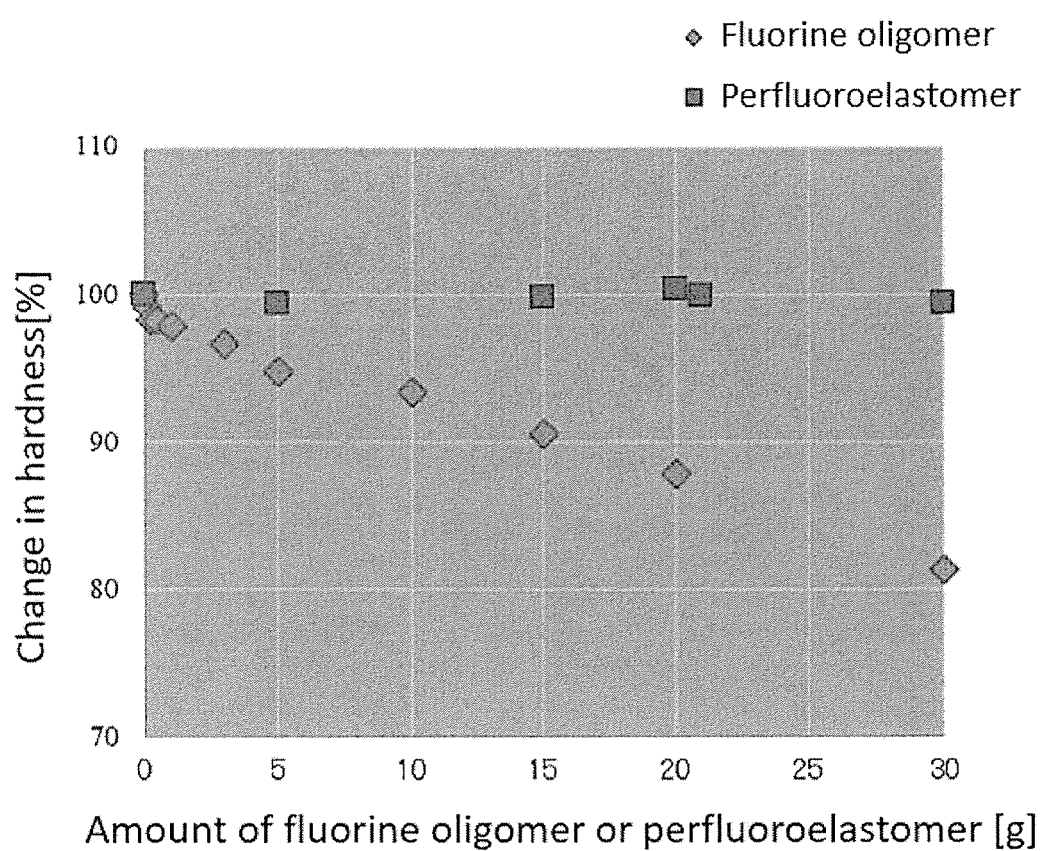
FIG. 7 is a graph showing the percentage change in the hardness of seal members.

FIG. 7 is a graph showing the percentage change in the hardness of the seal members. Furthermore, taking the hardness of elastomer (B) alone as 100, the graph represents the hardness when the same amount of fluorine oligomer (a) added as in each seal member with perfluoroelastomer (A) added was added as a ratio to the hardness of elastomer (B) alone (100). As is evident from FIG. 7, the hardness of elastomer (B) scarcely changed when the perfluoroelastomer (A) was added to the elastomer (B). On the other hand, the hardness of elastomer (B) decreased when a fluorine oligomer (a) was added to the elastomer (B).

[Evaluation of Plasma Resistance when the Filler was Varied]

Examples 30 and 31

As shown in FIG. 7, addition of a fluorine oligomer (a) to a crosslinkable elastomer was confirmed to lower the hardness of the molded article. Next, SiC which has excellent plasma resistance performance was used in place of the Cancarb used as the filler in Examples 1-10. The following products were used as raw materials.

Fluorine oligomer (a): Krytox 143AD manufactured by DuPont, molecular weight 7480
Perfluoroelastomer (A): Dai-EL Perflow GA-15 manufactured by Daikin Industries, Ltd.
Elastomer (B): Fluorine Rubber P959, Solvay Specialty Polymers Japan
Co-crosslinking agent: TAIC manufactured by Nippon Kasei
Crosslinking agent: 25B manufactured by NOF Corporation
Filler: SiC (manufactured by Nanomakers Corporation), bulk density: 0.6 g/cm$^3$ Furthermore, the bulk density of the filler was calculated from its volume when 5 g of powder was placed in a 100 mL measuring cylinder (inner diameter 28 mm), and the scale was read after tapping 20 times from a height of 2 cm.

Using each raw material as the blend shown in Table 6, seal members were produced by the same procedure as in Examples 1-10 except for being molded for 15 minutes at 160° C. in the <Molding and secondary crosslinking (O ring production)> of Examples 1-10, and the plasma resistance was evaluated. The evaluation results are also shown in Table 6.

TABLE 6

|  |  | Example 30 | Example 31 |
|---|---|---|---|
| Raw materials Amount added (g) | Fluorine oligomer (a) | 10 | 10 |
|  | Perfluoroelastomer (A) | 20 | 20 |
|  | Elastomer (B) | 80 | 80 |
|  | Co-crosslinking agent | 2 | 2 |
|  | Crosslinking agent | 1 | 1 |
|  | Filler | 15 | 0 |
| Plasma resistance | Weight loss | 0.60 | 2.50 |

As shown in Table 6, addition of SiC as a filler improved the plasma resistance remarkably. By adding the fluorine oligomer (a), the hardness of the molded article became lower. Therefore, it became clear that the degree of freedom in blending raw materials, such as the type and amount of filler added and the like, will increase since a filler having the predetermined properties can be added with respect to the amount by which the hardness decreases, when producing molded articles of the same hardness as in the past.

[Evaluation of Change in Hardness when the Crosslinkable Elastomer Component was Varied]

Examples 32 and 33 and Comparative Example 8

The change in hardness when only perfluoroelastomer (A) was used as the crosslinkable elastomer was evaluated. The raw material blends were as shown in Table 7; the perfluoroelastomer (A) was the same product as was used in «Examples 24-29»; and the other raw materials were the same as in «Example 1-10». Seal members were also produced, and the plasma resistance was evaluated by the same procedures as in Examples 1-10. Also, the hardness was measured by the same procedure as in the [Relationship between amount of fluorine oligomer (a) added and hardness] above. The evaluation results are also shown in Table 7.

TABLE 7

|  |  | Example 32 | Example 33 | Comparative Example 8 |
|---|---|---|---|---|
| Raw materials Amount added (g) | Fluorine oligomer (a) | 5 | 10 | 0 |
|  | Perfluoroelastomer (A) | 100 | 100 | 100 |
|  | Elastomer (B) | 0 | 0 | 0 |
|  | Co-crosslinking agent | 2 | 2 | 2 |
|  | Crosslinking agent | 1 | 1 | 1 |
|  | Filler | 15 | 15 | 15 |
| Hardness |  | 70 | 65 | 75 |
| Plasma resistance | Weight loss | 0.01 | 0.01 | 0.01 |

As shown in Table 7, it became evident that addition of the fluorine oligomer (a) was able to decrease the hardness of the molded article even when only a perfluoroelastomer (A) was used as the crosslinkable elastomer. Furthermore, the plasma resistance was basically the same even with addition of the fluorine oligomer (a) when only perfluoroelastomer (A) was used. It is thought that the plasma resistance did not change because the perfluoroelastomer (A) is a material with especially excellent plasma resistance.

Example 34 and Comparative Example 9

Next, the change in hardness was evaluated when a crosslinkable elastomer other than elastomer (B) and perfluoroelastomer (A) was used as the crosslinkable elastomer. The blend of raw materials was as shown in Table 8. The raw materials other than the ethylene-propylene rubber (EPDM, manufactured by Lunxess, Keltan 8340A) used as the crosslinkable elastomer were the same as in «Examples 1-10». Next, seal members were produced by the same procedure as in Examples 1-10. The hardness was also measured by the same procedure as in [Relationship between amount of fluorine oligomer (a) added and hardness] above. The evaluation results are also shown in the table.

TABLE 8

|  |  | Example 34 | Comparative example 9 |
|---|---|---|---|
| Raw materials Amount added (g) | Fluorine oligomer (a) | 10 | 0 |
|  | Ethylene-propylene rubber | 100 | 100 |
|  | Crosslinking agent | 3 | 3 |
|  | Filler | 120 | 120 |
| Hardness |  | 72 | 81 |

As shown in Table 8, it became clear that addition of a fluorine oligomer (a) can decrease the hardness of the molded article even when a crosslinkable elastomer other than elastomer (B) and perfluoroelastomer (A) is used.

Based on the results of the above Examples 1-34 and Comparative Examples 1-9, it became clear that addition of a hydrogen-free fluorine oligomer (a) to a crosslinkable elastomer can decrease the hardness of the molded articles obtained. Also, depending on the type of crosslinkable elastomer, addition of a fluorine oligomer (a) can improve the plasma resistance of the molded articles. Therefore, addition of a fluorine oligomer (a) to a crosslinkable elastomer can decrease the hardness of the molded articles and can increase the flexibility of the molded articles. Also, it became clear that the degree of freedom in addition of fillers and the like and blending of raw materials of the composition and molded articles can increase.

INDUSTRIAL APPLICABILITY

The compositions shown in the embodiments and molded articles obtained from said compositions can lower the hardness and also increase the degree of freedom in blending raw materials. Therefore, they can be used suitably as molded articles such as seal members of various apparatus such as plasma treatment apparatus and semiconductor manufacturing apparatus.

The invention claimed is:

1. A crosslinkable elastomer composition including at least a hydrogen-free fluorine oligomer (a) and a crosslinkable elastomer, wherein:
   the crosslinkable elastomer includes at least:
      one elastomer (B) selected from the group consisting of vinylidene fluoride/hexafluoropropene-based copolymers, vinylidene fluoride/hexafluoropropene/tetrafluoroethylene-based copolymers, tetrafluoroethylene/propylene-based copolymers; copolymers obtained by copolymerizing ethylene or perfluoroalkylvinyl ether with these copolymers; block copolymers of vinylidene fluoride/hexafluoropropene/tetrafluoroethylene-based copolymers and tetrafluoroethylene/ethylene alternating copolymers or polyvinylidene fluoride; and silicone rubber,
   and/or
      a perfluoroelastomer (A) containing as copolymer units a perfluoroolefin, a perfluorovinyl ether selected from the group consisting of perfluoro(alkylvinyl) ethers, perfluoro(alkoxyvinyl) ethers, and mixtures thereof, and a curing site monomer, the crosslinkable elastomer includes the perfluoroelastomer (A), and
   the proportion of the perfluoroelastomer (A) is 99.5 or less when the total weight of the crosslinkable elastomer is taken to be 100.

2. The crosslinkable elastomer composition of claim 1, wherein the crosslinkable elastomer includes only the elastomer (B) and the perfluoroelastomer (A).

3. The crosslinkable elastomer composition of claim 1, wherein the proportion of hydrogen-free fluorine oligomer (a) to the crosslinkable elastomer is 0.1-30 wt %.

4. The crosslinkable elastomer composition of claim 3, wherein the proportion of hydrogen-free fluorine oligomer (a) to the crosslinkable elastomer is 1-15 wt %.

5. A molded article obtained by crosslinking the crosslinkable elastomer composition of claim 1.

6. A seal member in which the molded article of claim 5 is in the shape of a seal.

7. A plasma treatment apparatus including the seal member of claim 6.

8. A semiconductor manufacturing apparatus including the seal member of claim 6.

9. The crosslinkable elastomer composition according to claim 2, wherein the proportion of hydrogen-free fluorine oligomer (a) to the crosslinkable elastomer is 0.1-30 wt %.

10. A molded article obtained by crosslinking the crosslinkable elastomer composition of claim 2.

11. A molded article obtained by crosslinking the crosslinkable elastomer composition of claim 3.

12. The crosslinkable elastomer composition of claim 1, wherein a molecular weight of the hydrogen-free fluorine oligomer (a) is 3830-8200.

13. The crosslinkable elastomer composition of claim 12, wherein a basic skeleton of the hydrogen-free fluorine oligomer (a) is selected from formulas (1)-(8):

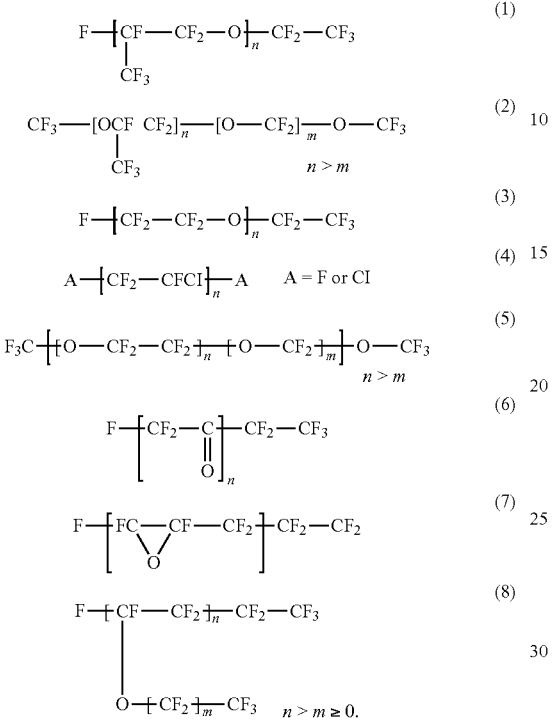

14. A crosslinkable elastomer composition including at least a hydrogen-free fluorine oligomer (a) and a crosslinkable elastomer, wherein:
the crosslinkable elastomer includes at least:
one elastomer (B) selected from the group consisting of vinylidene fluoride/hexafluoropropene-based copolymers, vinylidene fluoride/hexafluoropropene/tetrafluoroethylene-based copolymers, tetrafluoroethylene/propylene-based copolymers; copolymers obtained by copolymerizing ethylene or perfluoroalkylvinyl ether with these copolymers; block copolymers of vinylidene fluoride/hexafluoropropene/tetrafluoroethylene-based copolymers and tetrafluoroethylene/ethylene alternating copolymers or polyvinylidene fluoride; and silicone rubber, and
a perfluoroelastomer (A) containing as copolymer units a perfluoroolefin, a perfluorovinyl ether selected from the group consisting of perfluoro(alkylvinyl) ethers, perfluoro(alkoxyvinyl) ethers, and mixtures thereof, and a curing site monomer,
the crosslinkable elastomer includes the perfluoroelastomer (A), and
the proportion of the perfluoroelastomer (A) is 99.5 or less when the total weight of the crosslinkable elastomer is taken to be 100.

15. The crosslinkable elastomer composition of claim 14, wherein a molecular weight of the hydrogen-free fluorine oligomer (a) is 3830-8200.

16. The crosslinkable elastomer composition of claim 15, wherein a basic skeleton of the hydrogen-free fluorine oligomer (a) is selected from formulas (1)-(8):

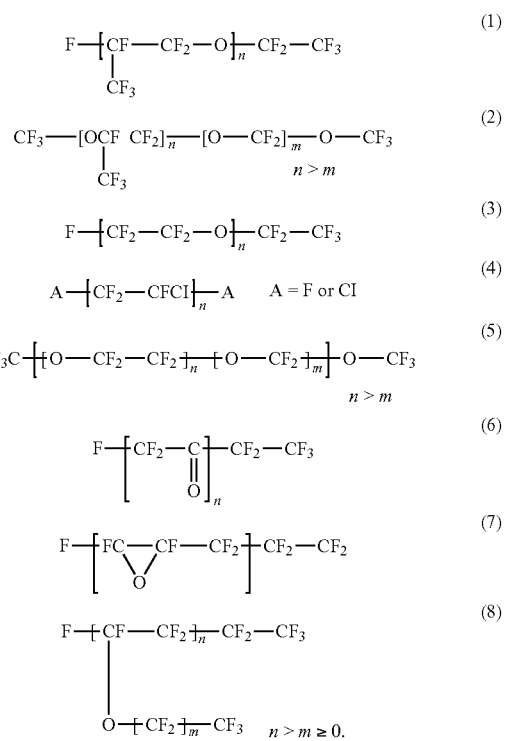

17. The crosslinkable elastomer composition of claim 14, wherein the proportion of hydrogen-free fluorine oligomer (a) to the crosslinkable elastomer is 0.1-30 wt %.

18. The crosslinkable elastomer composition of claim 17, wherein the proportion of hydrogen-free fluorine oligomer (a) to the crosslinkable elastomer is 1-15 wt %.

19. A molded article obtained by crosslinking the crosslinkable elastomer composition of claim 14.

20. A seal member in which the molded article of claim 19 is in the shape of a seal.

21. A plasma treatment apparatus including the seal member of claim 20.

22. A semiconductor manufacturing apparatus including the seal member of claim 20.

* * * * *